United States Patent
Cunningham

(10) Patent No.: US 9,218,005 B2
(45) Date of Patent: Dec. 22, 2015

(54) APPARATUS AND METHOD FOR REDUCING ACTUATOR THRUST REQUIREMENTS IN A CONTROL VALVE

(71) Applicant: Dresser, Inc., Addison, TX (US)

(72) Inventor: Thomas Henry Cunningham, Canton, MA (US)

(73) Assignee: Dresser, Inc., Addison, TX (US)

( * ) Notice: Subject to any disclaimer, the term of this patent is extended or adjusted under 35 U.S.C. 154(b) by 417 days.

(21) Appl. No.: 13/681,795

(22) Filed: Nov. 20, 2012

(65) Prior Publication Data

US 2014/0137947 A1    May 22, 2014

(51) Int. Cl.
*F16K 39/02*    (2006.01)
*G05D 16/00*    (2006.01)

(52) U.S. Cl.
CPC .............. *G05D 16/00* (2013.01); *F16K 39/022* (2013.01); *F16K 39/024* (2013.01); *Y10T 137/0379* (2015.04); *Y10T 137/2521* (2015.04)

(58) Field of Classification Search
CPC ...... F16K 39/022; F16K 39/024; G05D 16/00
USPC ...................... 251/33, 38, 281, 282
See application file for complete search history.

(56) References Cited

U.S. PATENT DOCUMENTS

| | | | |
|---|---|---|---|
| 3,114,532 A * | 12/1963 | Gray et al. | 251/30.01 |
| 3,624,753 A | 11/1971 | Brumm | |
| 4,779,837 A * | 10/1988 | Mito et al. | 251/26 |
| 5,339,857 A * | 8/1994 | Scallan et al. | 251/38 |
| 5,564,673 A * | 10/1996 | Pieren | 251/30.03 |
| 5,564,674 A | 10/1996 | Kalin et al. | |
| 6,283,152 B1 * | 9/2001 | Corte et al. | 137/614.11 |
| 7,762,520 B2 * | 7/2010 | Petersen | 251/30.04 |
| 2007/0210270 A1 | 9/2007 | Stephenson et al. | |

FOREIGN PATENT DOCUMENTS

EP    0017868 A1    10/1980
EP    0900962 A2    3/1999

OTHER PUBLICATIONS

PCT Search Report and Written Opinion dated Mar. 7, 2014 issued in connection with corresponding Application No. PCT/US2013/069789.

* cited by examiner

*Primary Examiner* — John K Fristoe, Jr.
*Assistant Examiner* — Nicole Wentlandt
(74) *Attorney, Agent, or Firm* — Paul Frank + Collins P.C.

(57) ABSTRACT

A trim assembly is provided with a cage with an internal surface and a cage port. A plug having an external surface is disposed in the cage and is operable between a closed position, a pressure balancing position and an open position. The trim assembly also includes a low friction flow restrictor disposed between the cage and the plug and a pressure energized seal disposed between the cage and the plug. A seal balancing volume defined by the internal surface of the cage, the external surface of the plug, the low friction flow restrictor and the pressure energized seal is provided. The seal balancing volume is in fluid communication with the cage port through the low friction flow restrictor and is maintained at a seal balancing volume pressure. The trim assembly further includes a pressure control assembly configured to vent the seal balancing volume.

19 Claims, 4 Drawing Sheets

APPARATUS AND METHOD FOR REDUCING ACTUATOR THRUST REQUIREMENTS IN A CONTROL VALVE

CROSS-REFERENCE TO RELATED APPLICATIONS

This invention is related to U.S. patent application Ser. No. 13/681,756 of Christopher Edward Wolfe, Nuo Sheng, Xuele Qi, Azam Mihir Thatte, James Albert Stares, Thomas Henry Cunningham and Henry Boger, filed concurrently herewith, assigned to the same assignee as the present invention that is hereby incorporated by reference.

TECHNICAL FIELD

The subject matter disclosed herein generally relates to control valves and more particularly to control valves with reduced actuator requirements.

BACKGROUND

Control valves are used to control the flow of fluids in systems used in the oil and gas processing, power generation, refining, petrochemical, and water control industries. Conventional control valves typically include a valve body with an inlet and an outlet. A cage and a seat ring are disposed between the inlet and outlet. The cage has at least one port allowing fluid communication between inlet and outlet of the control valve. The term "fluid communication" means allowing fluid to pass between or through as in fluid passing from one volume to another volume through a conduit. A plug is concentrically disposed in the cage and allowed to axially translate exposing the cage port(s) and modulating the fluid flow. The plug is connected to an actuator by means of a stem. The actuator is a device that supplies force and motion to open or close a valve, and may be powered by mechanical, pneumatic, hydraulic or electrical means.

Some control valves are designed to balance the pressure across the valve plug to reduce the amount of force necessary to open and close the valve with the actuators. Balanced control valves typically include a cage, a plug, a stem, a seat ring, and a balance seal. The plug has at least one conduit or orifice allowing fluid communication between the top and bottom which will balance the pressure across it. A seal ring may be provided between the plug and the cage to minimize fluid leakage. Balanced control valves, typically will have two main possible fluid leakage paths when closed. The first leakage path is between the plug and seat ring, where sufficient actuator force will provide hard metal-to-metal contact to impede flow. This leakage may occur even when the plug is in contact with the valve seat. A second possible leakage path is the seal ring disposed between the plug and cage.

The American National Standards Institute ("ANSI") has established leakage classifications (ANSI/FCI 70-2) for control valves. The standard categorizes seat leakage into six classes (Class I to Class VI). The leakage criteria become more stringent as the class number increases. Class V represents what is commonly referred to as an "effectively zero-leakage" control valve. The standard for Class V valves requires that the maximum leakage allowed through a valve is 0.0005 ml of water per minute, per inch of port diameter, per PSI differential pressure as measured from an inlet port of the valve to an outlet port of the valve.

Balanced valves may be used with a number of different seals disposed between the plug and the cage, such as for example a piston ring seal. Piston ring seals may be manufactured from a variety of materials—such as Teflon, metal, and graphite—depending on the valve application (i.e., type of fluid, temperature, pressure). Teflon piston ring seals, for instance, may allow for a reasonably tight shutoff but be limited in usage by fluid temperature. Graphite and metal piston ring seals may allow for the valve to be used in higher temperature applications, but such materials may not allow for tight shut-off.

A typical piston ring seal may generate considerable friction while in contact with its sealing surface. This friction may be acceptable for applications that allow for leakage higher than the leakage requirements of FCI 70-2 Class V. For example, Class II, Class III or even Class IV, require less contact pressure to meet their respective leakage requirements, but Class V is several orders of magnitude tighter in comparison. To achieve Class V shutoff with a piston ring type sealing member at temperatures above the usable range of elastomers or thermoplastics will typically result in high friction resulting in a high actuation requirement (i.e. a high force is required to open and close the valve) making it difficult to operate the valve.

BRIEF DESCRIPTION OF THE INVENTION

The disclosure provides a solution to the problem of maintaining a Class V seal without requiring a high actuator thrust. Additionally the disclosure provides a solution to the problem of maintaining a tight seal with lower actuation thrust requirements at temperatures above the upper usable limits of elastomeric or thermoplastic materials.

In accordance with one exemplary non-limiting embodiment, the invention relates to a trim assembly having a cage with an internal surface and a cage port. A plug having an external surface is disposed in the cage and is operable between a closed position, a pressure balancing position and an open position. The trim assembly also includes a low friction flow restrictor disposed between the cage and the plug and a pressure energized seal disposed between the cage and the plug. A seal balancing volume defined by the internal surface of the cage, the external surface of the plug, the low friction flow restrictor and the pressure energized seal is provided. The seal balancing volume is in fluid communication with the cage port through the low friction flow restrictor and is maintained at a seal balancing volume pressure. The trim assembly further includes a pressure control assembly configured to pressurize the seal balancing volume.

In another embodiment, a trim assembly is provided having a cage with an interior surface and a cage port. A plug having an outer surface, a top portion and a bottom portion is disposed within the cage. The plug is movable between a closed position, a pressure balancing position and an open position. The trim assembly also includes a low friction flow restrictor disposed between the interior surface of the cage and the outer surface of the plug, and a pressure energized seal disposed between the interior surface of the cage and the outer surface of the plug, the pressure energized seal being maintained at a seal pressure. A pressure control assembly configured to control a differential pressure acting on the pressure energized seal is also included.

In another embodiment, a method of operating a trim assembly includes maintaining a downstream pressure at a cage port formed on a cage. The method also includes maintaining an upstream pressure above and below a plug disposed in the cage. The plug is movable between a closed position, a pressure balancing position and an open position. The method includes balancing a differential pressure acting on a pressure energized seal disposed in a seal balancing volume when the plug is in the pressure balancing position and in the open position.

BRIEF DESCRIPTION OF THE DRAWINGS

Other features and advantages of the present invention will be apparent from the following more detailed description of the preferred embodiment, taken in conjunction with the accompanying drawings which illustrate, by way of example, the principles of certain aspects of the invention.

DETAILED DESCRIPTION OF THE INVENTION

In a preferred embodiment the trim assembly of the disclosure is provided with a cage, a plug disposed in the cage, a low friction flow restrictor, and a high friction pressure energized seal. The interior of the cage, the exterior of the plug the low friction flow restrictor, and the high friction pressure energized seal define a seal balancing volume. When the trim assembly is in the closed position the pressure in the seal balancing volume is maintained at the downstream pressure. When the trim assembly is in a pressure balancing position the seal balancing volume is pressurized and maintained at an upstream pressure. Pressure balancing of the high friction pressure energized seal is accomplished by allowing fluid at an upstream pressure to flow through a balancing port into the seal balancing volume between the high friction pressure energized seal and the low friction flow restrictor. Leakage of the fluid through low friction flow restrictor is less than the inflow to the seal balancing volume so that, after an interval of time, the pressure in the seal balancing volume is increased to the upstream pressure thereby reducing or eliminating the pressure differential acting on the pressure energized seal. The result is that the pressure exerted against the cage by the pressure energized seal is significantly reduced and the contact between the pressure energized seal and the cage is eliminated before main plug travel occurs. Balancing of the pressure in the seal balancing volume with the upstream pressure reduces the pressure differential acting on the high friction pressure energized seal thereby reducing or eliminating contact between the seal and the cage resulting in reduced friction. Reduction of the friction reduces the actuator thrust required to move the trim assembly to the open position and during throttling.

Figure 1:
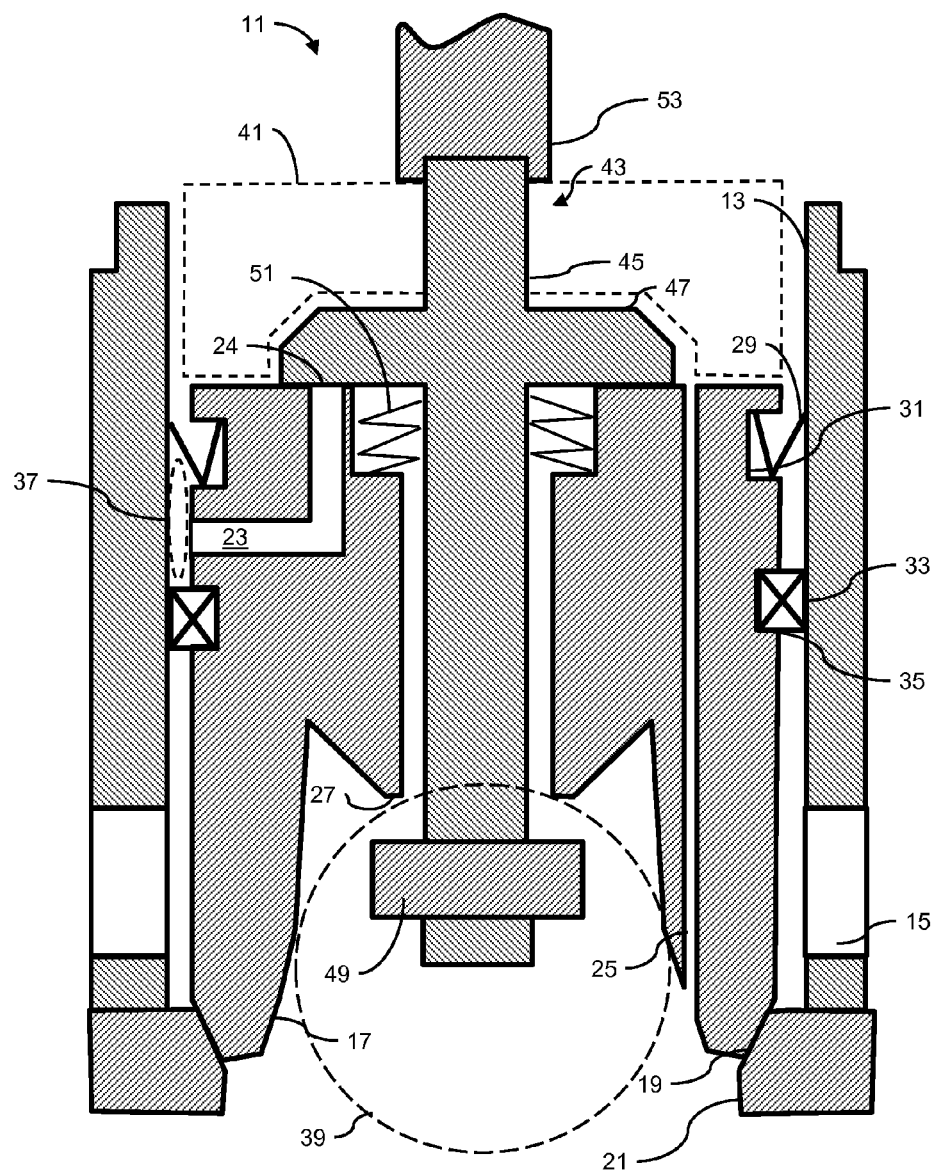
FIG. 1 is a cross section of an embodiment of a valve trim in the closed position.

Illustrated in FIG. 1 is an embodiment of a trim assembly 11 with reduced actuator thrust requirements. The trim assembly 11 includes a cage 13 having a cage port 15, and a plug 17 disposed within the cage 13. The plug 17 is configured to slide within the cage 13.

The plug 17 is provided with a seating surface 19 that engages a seat ring 21 disposed below the cage 13. The plug 17 includes a balancing conduit 23 having an opening 24 and a longitudinal conduit 25. The plug 17 may also be provided with a plug platform 27 at the bottom of the plug 17.

The trim assembly 11 is provided with a high friction, pressure energized seal 29 disposed in a sealing gland 31 formed in the plug 17 or the cage 13. As increasing pressure is applied to the high friction pressure energized seal 29, it deforms and continues to seal against the seal surfaces with higher internal stress and contact pressure thereby increasing friction. The trim assembly 11 is also provided with a low friction flow restrictor 33 disposed in a restrictor gland 35 formed in the plug 17 or the cage 13. In an embodiment the low friction flow restrictor 33 may be a piston seal. The interior of the cage 13, the exterior of the plug 17 together with the high friction, pressure energized seal 29 and the low friction flow restrictor 33 define a seal balancing volume 37 (corresponding to the dashed line 37 in FIG. 1). Disposed below the plug 17 is an upstream volume 39 (corresponding to the dashed line 39 in FIG. 1) which is maintained at an upstream pressure. Disposed above the plug 17 is a pressurizing volume 41 (corresponding to the dashed line 41 in FIG. 1) that is also maintained at an upstream pressure due to fluid communication with the upstream volume 39 via conduit 25. The terms "above" and "below" are used to refer to relative locations of identified elements with reference to the drawings and are not intended to denote the orientation of the components of the trim assembly 11 in actual use.

The trim assembly 11 also includes a stem assembly 43 having a stem 45, a sealing flange 47, and a nut 49. The stem assembly 43 may be biased with a spring 51 that engages the sealing flange 47. The stem assembly 43 may be coupled to an actuator 53 that drives the stem assembly 43 and causes the stem assembly 43 to slide within the cage 13.

FIG. 1 illustrates an embodiment of the trim assembly 11 with the plug 17 in the closed position. In the closed position, upstream volume 39 is maintained at the upstream pressure P1, and the cage port 15 is maintained at a downstream pressure (P2). The pressure in upstream volume 39 (P1) will be higher than the pressure at the cage port 15 (P2). The seating surface 19 of the plug 17 is seated against the seat ring 21 forming a tight seal. The plug 17 is forced against the seat ring 21 by the actuator 53. The sealing flange 47 seals the balancing conduit 23. The high friction pressure energized seal 29 and the low friction flow restrictor 33 seals off the seal balancing volume 37. It should be noted that the low friction flow restrictor 33 permits a limited flow of fluid so that the pressure of the seal balancing volume 37 is substantially the same as the downstream pressure of the fluid at the cage port 15 (P2). Pressurizing volume 41 is in fluid communication with the upstream volume 39 through longitudinal conduit 25, thereby maintaining the pressure in the pressurizing volume 41 at the upstream pressure P1. The pressure differential between the pressure in the seal balancing volume 37 (P2) and the pressure in pressurizing volume 41 (P1) keeps the high friction pressure energized seal 29 fully pressurized and in a tight sealing relationship with the cage 13.

Figure 2:
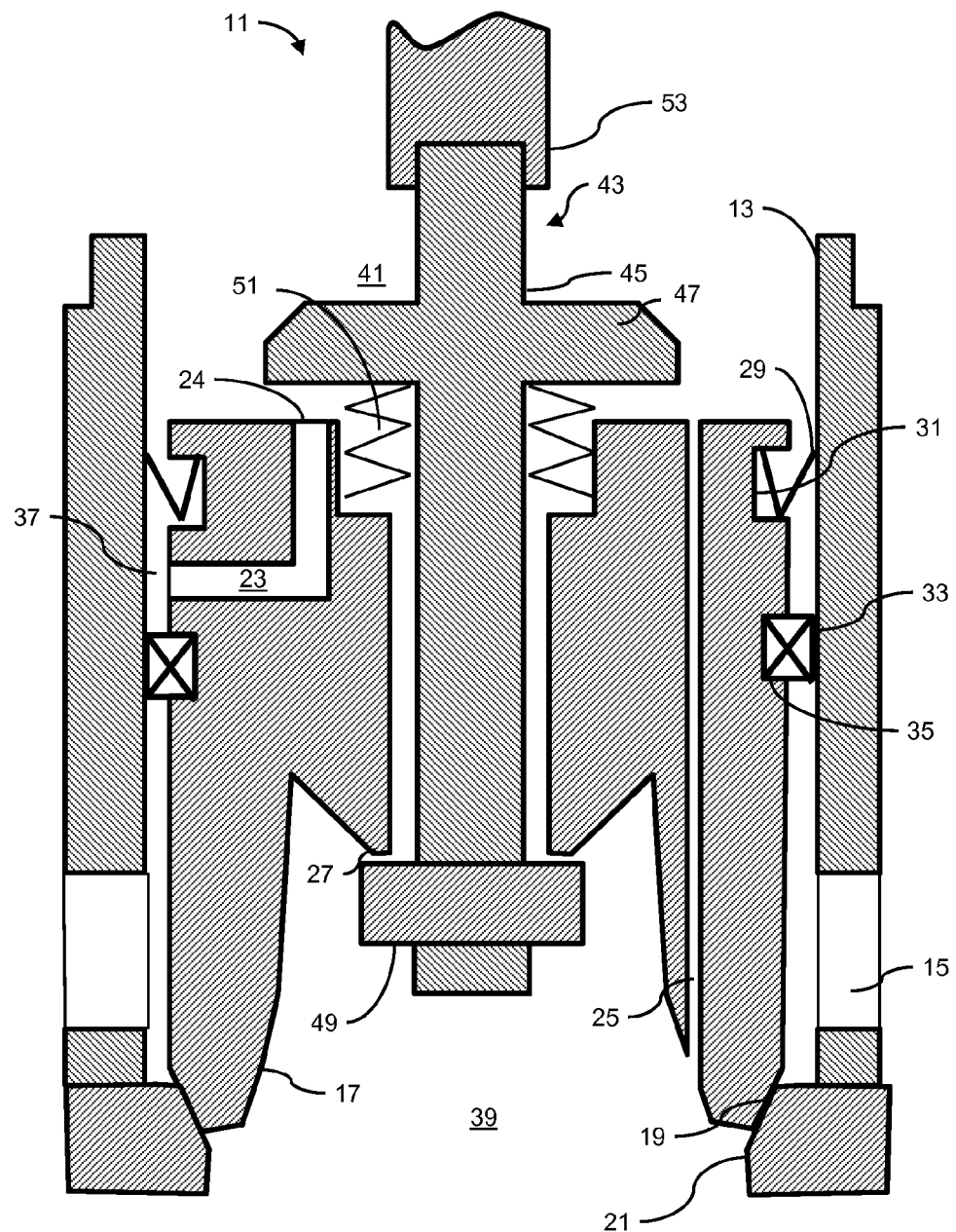
FIG. 2 is a cross section of an embodiment of a valve trim in the pressure balanced position.

FIG. 2 shows the trim assembly 11 with the plug 17 in a pressure balancing position. In this position, the stem assembly 43 has been displaced and the attached sealing flange 47 is also displaced thereby uncovering the balancing conduit 23. The seal balancing volume 37 is then fluidly coupled with the pressurizing volume 41 that is at upstream pressure P1. The low friction flow restrictor 33 restricts the fluid flow from seal balancing volume 37 to the cage port 15 to a rate sufficiently lower than the rate at which fluid flows from the upstream volume 39 through conduit 23 thereby pressurizing the seal balancing volume 37. The net result is that the pressure of the fluid at the seal balancing volume 37 is balanced with the pressure of the fluid at the pressurizing volume 41 thereby reducing the differential pressure acting on the high friction pressurized seal 29. For the purposes of this disclosure "balanced" means that the difference between the seal pressure and the upstream pressure is reduced.

Figure 3:
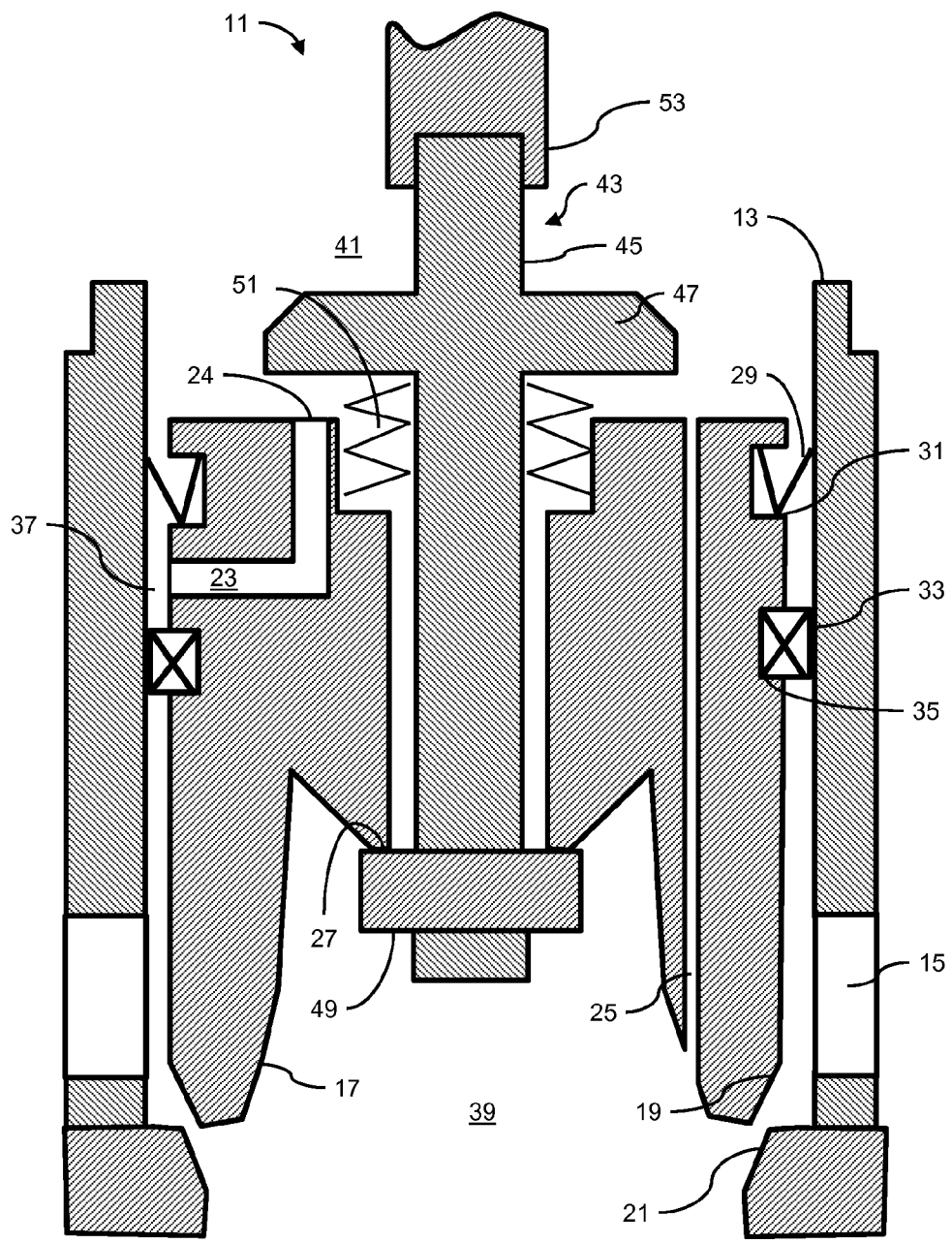
FIG. 3 is a cross section of an embodiment of a valve trim in the open position.

Illustrated in FIG. 3 is the trim assembly 11 with the plug 17 in an open throttling position. The stem assembly 43 is displaced upwardly and the nut 49 engages the bottom of the plug 17. The seal pressure acting on the high friction pressure energized seal 29 has been balanced thereby reducing or eliminating the contact of the high friction pressure energized seal 29 with the cage 13. The friction between the high friction pressurized seal 29 and the cage 13 is consequently reduced. The reduction in friction reduces the thrust required by the actuator 53 to displace the plug 17. The thrust provided by the actuator may be provided by mechanical, pneumatic, hydraulic or electrical means.

Figure 4:
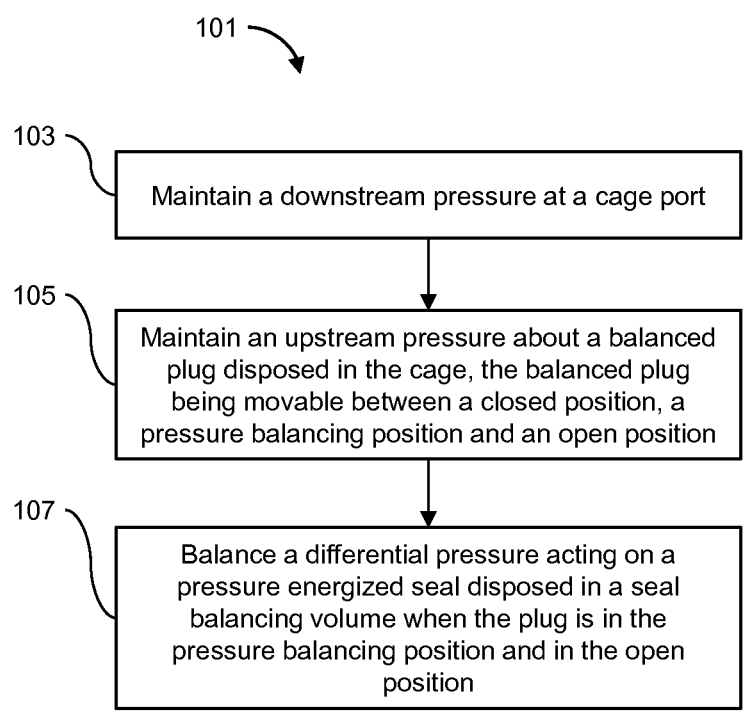
FIG. 4 is a flowchart of an embodiment of a method of operating a trim assembly.

Illustrated in FIG. 4 is a method 101 of operating a trim assembly 11 in accordance with one embodiment. The method 101 is implemented by the trim assembly 11.

In step 103 the trim assembly 11 maintains a downstream pressure at a cage port 15 formed on a cage 13.

In step 105 the trim assembly 11 maintains an upstream pressure about a balanced plug 17 disposed in the cage 13, the balanced plug 17 being movable between a closed position, a pressure balancing position and an open position.

In step 107 the trim assembly 11 balances a seal pressure differential acting on a high friction pressure energized seal 29 disposed in a seal balancing volume 37 so that when the plug 17 is closed the pressure differential acting on the balance seal 29 is equal to the full pressure differential P1-P2, and the pressure differential is minimized or removed when the plug 17 is in the pressure balancing or open position. This may be accomplished by pressurizing the seal balancing volume 37 to the upstream pressure. To control the pressure in the seal balancing volume 37 the plug 17 may be provided with an opening 24 at the top of the plug 17 and in fluid communication with the pressurizing volume 41. The opening 24 may be sealed by sealing flange 47 when the plug 17 is in the closed position. The opening 24 may be uncovered when the plug 17 is in the pressure balancing position. Although in the description of the preceding embodiments a sealing flange 47 is described as a means for sealing the opening 24, it would be apparent to one of ordinary skill in the art to provide other sealing members—for example a plug—without departing from the scope of the present invention.

Where the definition of terms departs from the commonly used meaning of the term, applicant intends to utilize the definitions provided below, unless specifically indicated.

The terminology used herein is for the purpose of describing particular embodiments only and is not intended to be limiting of the invention. Where the definition of terms departs from the commonly used meaning of the term, applicant intends to utilize the definitions provided herein, unless specifically indicated. The singular forms "a", "an" and "the" are intended to include the plural forms as well, unless the context clearly indicates otherwise. It will be understood that, although the terms first, second, etc. may be used to describe various elements, these elements should not be limited by these terms. These terms are only used to distinguish one element from another. The term "and/or" includes any, and all, combinations of one or more of the associated listed items. The phrases "coupled to" and "coupled with" contemplates direct or indirect coupling.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements.

What is claimed:

1. A trim assembly, comprising:
   a cage with an interior surface and a cage port;
   a plug disposed in the cage, the plug having an external surface and being operable between a closed position, a pressure balancing position, and an open position;
   a low friction flow restrictor disposed between the cage and the plug;
   a pressure energized seal disposed between the cage and the plug;
   a seal balancing volume;
   a pressure control assembly configured to pressurize the seal balancing volume; and
   a conduit in fluid communication with a volume at an upstream pressure when the plug is in the pressure balancing position,
   wherein the pressure control assembly is configured to allow fluid at the upstream pressure to flow into the seal balancing volume at a rate in which leakage of fluid through the low friction flow restrictor is less than flow of fluid into the seal balancing volume.

2. The trim assembly of claim 1, wherein the seal balancing volume is defined by the interior surface of the cage, an external surface of the plug, the low friction flow restrictor, and the pressure energized seal, and wherein the seal balancing volume is in fluid communication with the cage port through the low friction flow restrictor and is maintained at a seal balancing volume pressure.

3. The trim assembly of claim 2, wherein the pressure control assembly is configured to balance the seal balancing volume pressure acting on the pressure energized seal during any movement of the plug.

4. The trim assembly of claim 1, wherein the pressure control assembly is configured to balance a differential pressure acting on the pressure energized seal before any movement of the plug.

5. The trim assembly of claim 1, wherein the seal balancing volume and the volume at the upstream pressure are fluidly coupled through the conduit, wherein the conduit extends through the plug, and wherein the conduit has an opening proximate the volume at the upstream pressure.

6. The trim assembly of claim 5, wherein the pressure control assembly comprises:
   a stem coupled with the plug; and
   a sealing component coupled to the stem and configured to close off the opening of the conduit when the plug is in the closed position.

7. The trim assembly of claim 6, wherein the sealing component is disposed to open the opening of the conduit when the plug is in the pressure balancing position prior to any movement of the plug.

8. A trim assembly, comprising:
   a cage having an interior surface and a cage port;
   a plug disposed within the cage, the plug being movable between a closed position, a pressure balancing position, and an open position;
   a low friction flow restrictor disposed between the cage and the plug;
   a pressure energized seal disposed between the cage and the plug; and
   a pressure control assembly configured to control a differential pressure acting on the pressure energized seal,
   wherein the interior surface of the cage, an outer surface of the plug, the low friction flow restrictor, and the pressure energized seal define a seal balancing volume in fluid communication with a downstream volume, and wherein the pressure control assembly maintains the seal balancing volume at a downstream pressure when the plug is in the closed position.

9. The trim assembly of claim 8, wherein the pressure control assembly comprises a conduit extending from the seal balancing volume to a volume at an upstream pressure.

10. The trim assembly of claim 9, wherein the pressure control assembly comprises a stem assembly having a closure member closing the conduit when the plug is in the closed position and opening the conduit when the plug is in the pressure balancing position and in the open position.

11. The trim assembly of claim 10, wherein the stem assembly comprises a stem and the closure member comprises a sealing flange coupled to the stem, and wherein the sealing flange is disposed in contact with the conduit when the plug is in the closed position.

12. The trim assembly of claim 11, further comprising a spring that biases the sealing flange away from the conduit.

13. A method of operating a trim assembly, comprising:

forming a seal balancing volume between a cage, a plug disposed in the cage, and a pair of seals disposed about the plug and in contact with the cage, wherein the plug is configured to move between a closed position, a pressure balancing position, and an open position;

with the plug in the closed position, maintaining a downstream pressure at a cage port formed in the cage and an upstream pressure about the plug; and with the plug in one of the pressure balancing position and the open position, directing fluid through a conduit in the plug having an opening proximate an interior surface of the cage to balance a differential pressure acting on a first seal of the pair of seals that form the seal balancing volume.

14. The method of claim 13, wherein the differential pressure on the first seal is equal to the upstream pressure minus the downstream pressure with the plug is in the closed position.

15. The method of claim 13, wherein the conduit is in fluid communication with the seal balancing volume and a volume upstream of the plug.

16. The method of claim 15, further comprising moving a sealing member to open the conduit.

17. The method of claim 15, further comprising opening the conduit with the plug in the pressure balancing position.

18. The method of claim 13, wherein fluid leaks through the conduit at a rate so that flow of fluid through the first seal is less than flow of fluid into the seal balancing volume.

19. The method of claim 16, wherein the sealing member moves with the plug.

* * * * *